(12) United States Patent
Toyohara

(10) Patent No.: US 6,271,948 B1
(45) Date of Patent: Aug. 7, 2001

(54) WAVELENGTH DIVISION MULTIPLEXED OPTICAL COMMUNICATION SYSTEM

(75) Inventor: Atsushi Toyohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/078,574

(22) Filed: May 14, 1998

(30) Foreign Application Priority Data

May 16, 1997 (JP) .................................................. 9-143114

(51) Int. Cl.[7] .................................................. H04J 14/02
(52) U.S. Cl. ................................................ 359/127; 359/133
(58) Field of Search .................................. 359/341, 124, 359/127, 133, 115

(56) References Cited

U.S. PATENT DOCUMENTS

| | | | |
|---|---|---|---|
| 4,900,917 | * 2/1990 | Dixon et al. ........................ | 250/225 |
| 5,546,210 | * 8/1996 | Chraplyvy et al. ................. | 359/124 |
| 5,600,466 | * 2/1997 | Tsushima et al. .................. | 359/124 |
| 5,815,299 | * 9/1998 | Bayart et al. ....................... | 359/171 |
| 6,091,538 | * 7/2000 | Takeda et al. ...................... | 359/341 |

FOREIGN PATENT DOCUMENTS

| | | |
|---|---|---|
| 4-101124 | 4/1992 | (JP) . |
| 9-116493 | 5/1997 | (JP) . |
| 10-173264 | 6/1998 | (JP) . |

OTHER PUBLICATIONS

Japanese Office Action, dated Apr. 18, 2000, with English language translation of Japanese Examiner's comments.

* cited by examiner

Primary Examiner—Jason Chan
Assistant Examiner—Christina Y Leung
(74) Attorney, Agent, or Firm—McGuireWoods LLP

(57) ABSTRACT

It is the object of the invention to provide a small-sized and low-priced WDM optical signal transmission system, in which the transmitting power levels of optical signals are high and equalized. The WDM optical signal transmission system comprises plural light sources of different wavelengths, and the plural optical signals generated by the plural signal light sources are classified into several groups. The optical signals belonging to the same group are multiplexed by the same couplers and amplified by the same optical fiber amplifiers. The outputs of the optical fiber amplifiers are multiplexed by another coupler and supplied to an optical transmission line. in the modified WDM optical signal transmission system, optical band pass filters are respectively allocated between the output ports of the optical fiber amplifiers and the coupler, the outport of which is connected with the input end of the optical transmission line.

6 Claims, 5 Drawing Sheets

WAVELENGTH DIVISION MULTIPLEXED OPTICAL COMMUNICATION SYSTEM

FIELD OF THE INVENTION

The invention relates to a wavelength division multiplexed (WDX, hereinafter) optical communication system, and more particularly to a WDM optical communication system which is low in price and small in size to transmit optical signals with high and equalized levels.

BACKGROUND OF THE INVENTION

Recently, a WDM optical communication system, in which plural signals with different wavelengths are multiplexed and transmitted through a single optical transmission line, is being vigorously developed as means for realizing an optical transmission system with high capacity.

In order to extend the transmission distance of the WDM optical communication system, it is important that the transmission levels of the respective optical signals are as high as possible and equal to each other. Accordingly, following methods have been adopted to achieve the aforementioned purpose until now.

The first method is that outputs of plural signal light sources of different wavelengths are multiplexed by a coupler, and the signal light sources are so adjusted that the power levels of the optical signals are equalized at the output port of the coupler.

The second method is that optical variable attenuators are respectively inserted between the signal light sources and the coupler, and the optical variable attenuators are so adjusted that the power levels of the optical signals are equalized at the output port of the coupler.

The third method is that optical fiber amplifiers are respectively inserted between the signal light sources and the coupler, and the gains of the optical fiber amplifiers are so adjusted that the power levels of the optical signals are equalized at the output port of the coupler.

However, in the first and second methods, since the power levels of the optical signals are adjusted based on the minimum power level of them, so that the high transmitting power levels cannot be obtained.

According to the third method, since each of the signal light sources are respectively provided with the optical fiber amplifier, the system is magnified and high-priced.

SUMMARY OF THE INVENTION

Accordingly, it is an object of the invention to provide a low-priced and small-sized optical communication system, which transmits optical signals with high and equalized levels, by classifying optical signals into plural groups of plural optical signals.

It is an further object of the invention to provide a low-priced and small-sized optical communication system, which transmits optical signals with high and equalized levels, by classifying optical signals into one or more individual optical signals and one or more groups of plural optical signals.

According to the first feature of the invention, a WDM optical transmission system comprises:

plural signal light sources for respectively generating optical signals with different wavelengths, wherein the optical signals are classified into plural groups of the plural optical signals, plural first stage optical couplers for respectively multiplexing the plural groups of the plural optical signals, plural optical amplifiers for respectively amplifying outputs of the plural first stage optical couplers, and a second stage optical coupler for multiplexing outputs of the plural optical amplifiers.

According to the second feature of the invention, a WDM optical transmission system comprises;

plural signal light sources for respectively generating optical signals with different wavelengths, wherein, the optical signals are classified into one or more individual optical signals and one or more groups of optical signals, one or more first stage optical couplers for respectively multiplexing the one or groups of the optical signals, plural optical amplifiers for respectively amplifying the one or more individual optical signals and outputs of the one or more first stage optical couplers, and a second stage optical couplers for multiplexing outputs of the plural optical amplifiers.

BRIEF DESCRIPTION OF THE DRAWINGS

The invention will be explained in more detail in conjunction with appended drawings, wherein.

DESCRIPTION OF THE PREFERRED EMBODIMENT

Before explaining an WDM optical transmission system in the preferred embodiment according to the invention, the aforementioned conventional WDM optical transmission systems will be explained referring to FIGS. 1A and 1B and 2.

Figure 1A:
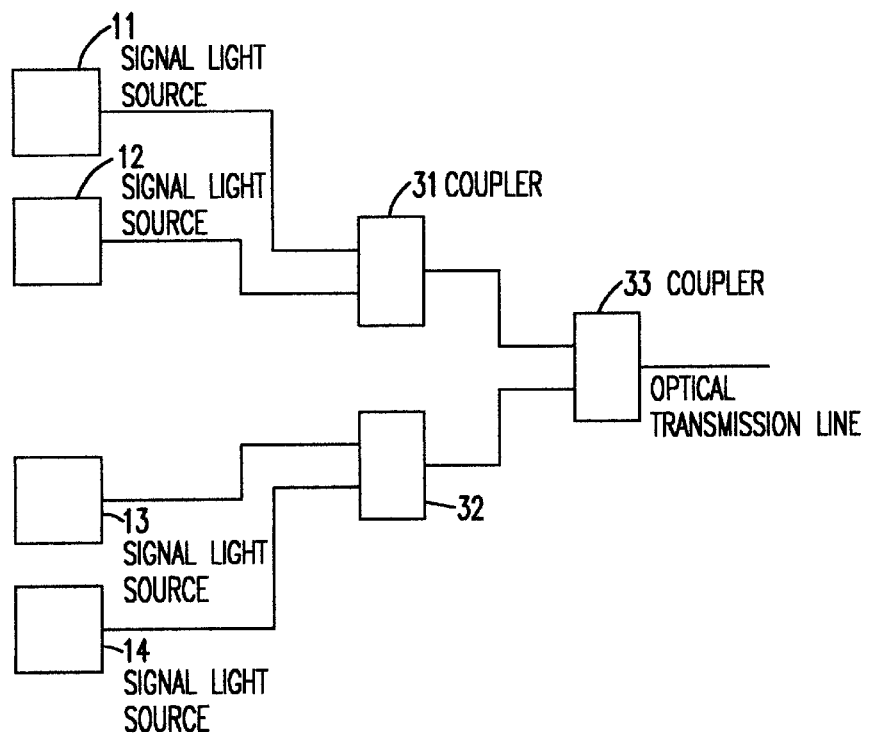
FIGS. 1A and 1B show conventional WDM optical transmission systems.

The first conventional method is that the output levels of signal light sources 11 to 14 are equalized by adjusting the respective signal light source as shown in FIG. 1A.

Figure 1B:
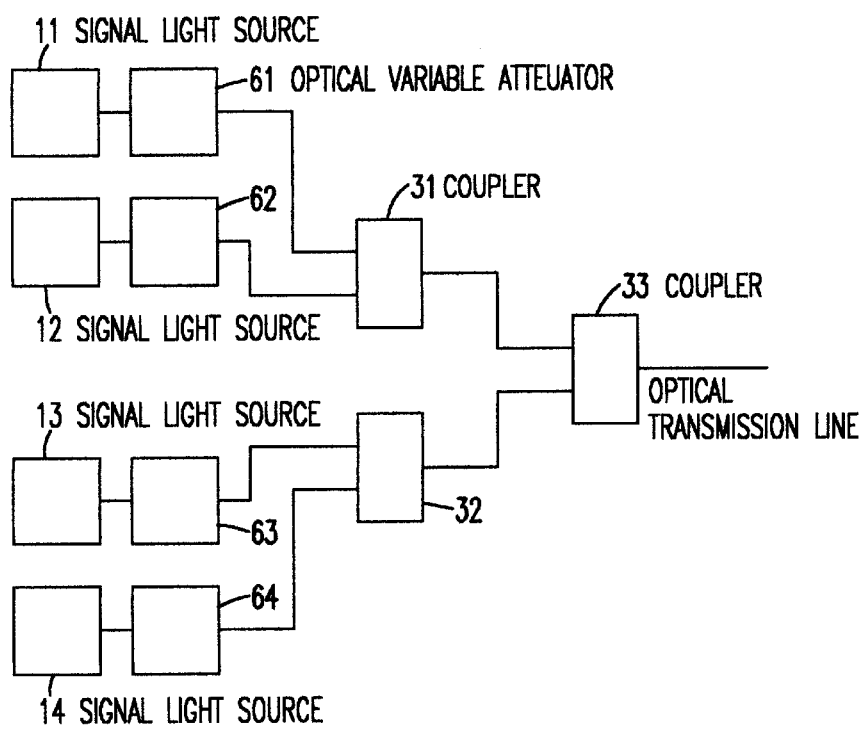

The second conventional method is that optical variable attenuators (ATT) 61 to 64 are respectively connected with the output ports of the signal light sources 11 to 14, and so adjusted that the transmitting levels of respective optical signals are equalized, as shown in FIG. 1B.

Figure 2:
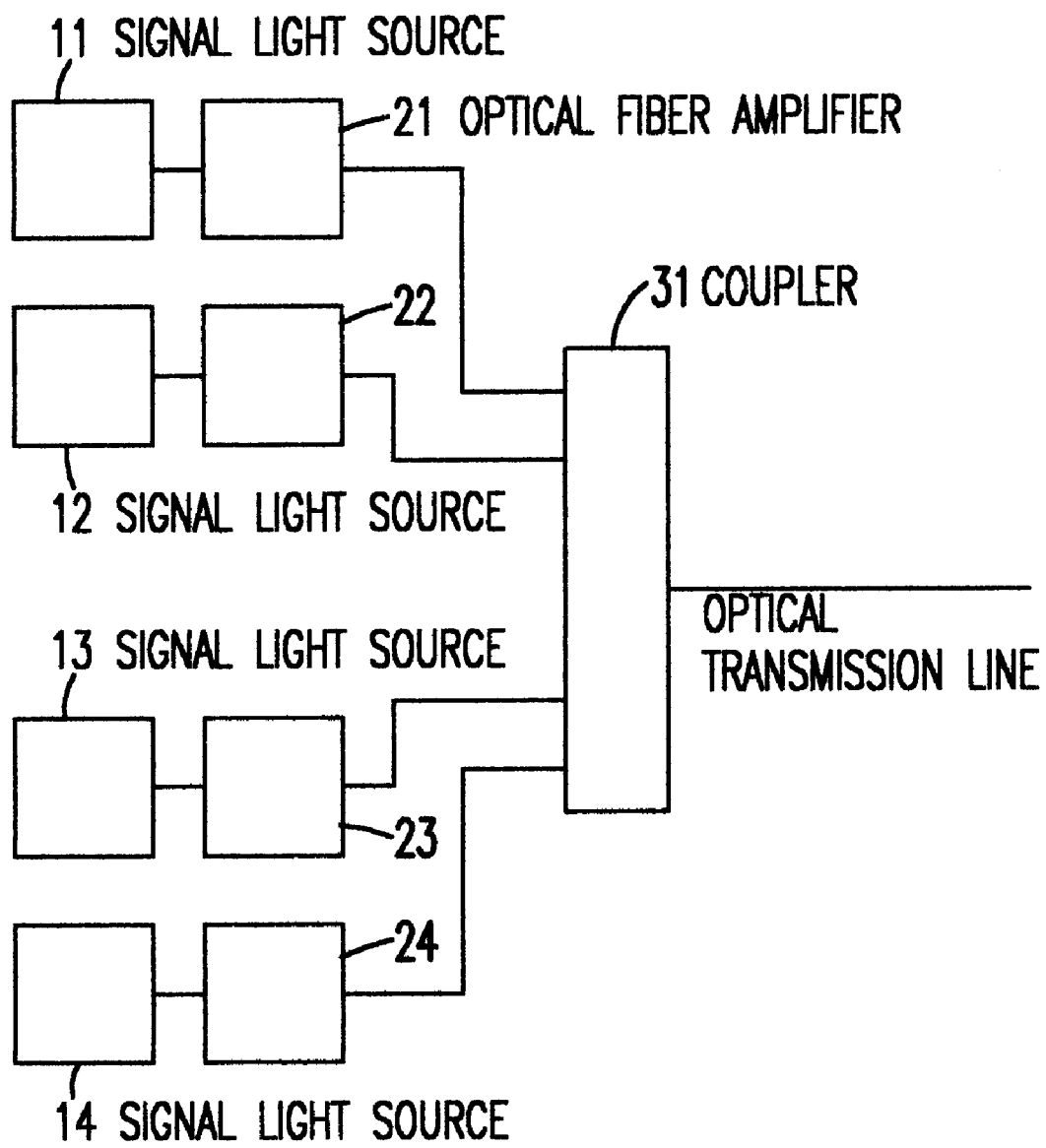
FIG. 2 shows a conventional WDM optical transmission system of another type.

The third method is that optical fiber amplifiers 21 to 24 with variable gains are respectively connected with the output ports of the signal light sources 11 to 14 as shown in FIG. 2.

According to the first and second method in the aforementioned conventional approaches, the high transmitting powers of the optical signals cannot been obtained, because the transmitting levels of the respective optical signals are adjusted based on the lowest level of them.

According to the third method, the signal light sources are respectively provided with the optical fiber amplifiers, so that the system is magnified and expensive.

Next, the principle and the operation of the invention will be explained. In the invention, the optical signals are classified into several groups in consideration of dependency of the gain of the optical fiber amplifier on the wavelength, and the optical signals belonging to the same group are multiplexed by the same optical coupler. The two ways for classifying the optical signals are proposed. In one of the ways, the optical signals with nearly the same wavelengths are classified into the same group, and in the other one of the ways, the optical signals, which have nearly the same power levels at the output ports of the optical fiber amplifiers because of the dependencies of the gains of the optical fiber amplifiers on the wavelengths of the optical signals, are classified into the same group.

The plural optical signals belonging to the same group are multiplexed by the same coupler, supplied to the same optical fiber amplifier, which is connected with the output port of the coupler, and amplified up to the desired powers. Moreover, the outputs of the optical fiber amplifiers are multiplexed by a coupler and transmitted through the same optical transmission line.

Figure 3:
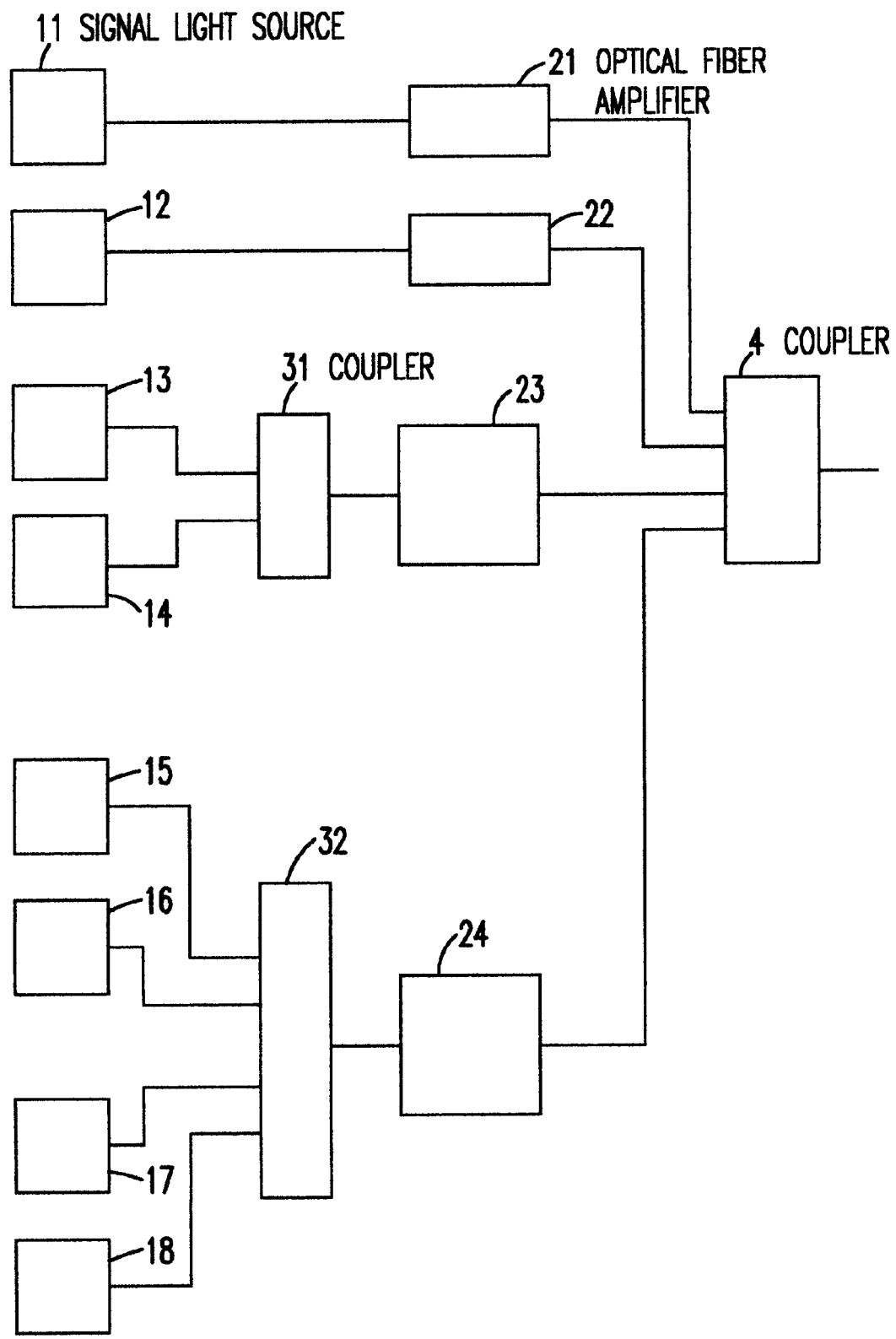
FIG. 3 shows a preferred embodiment of the invention.
Figure 4:
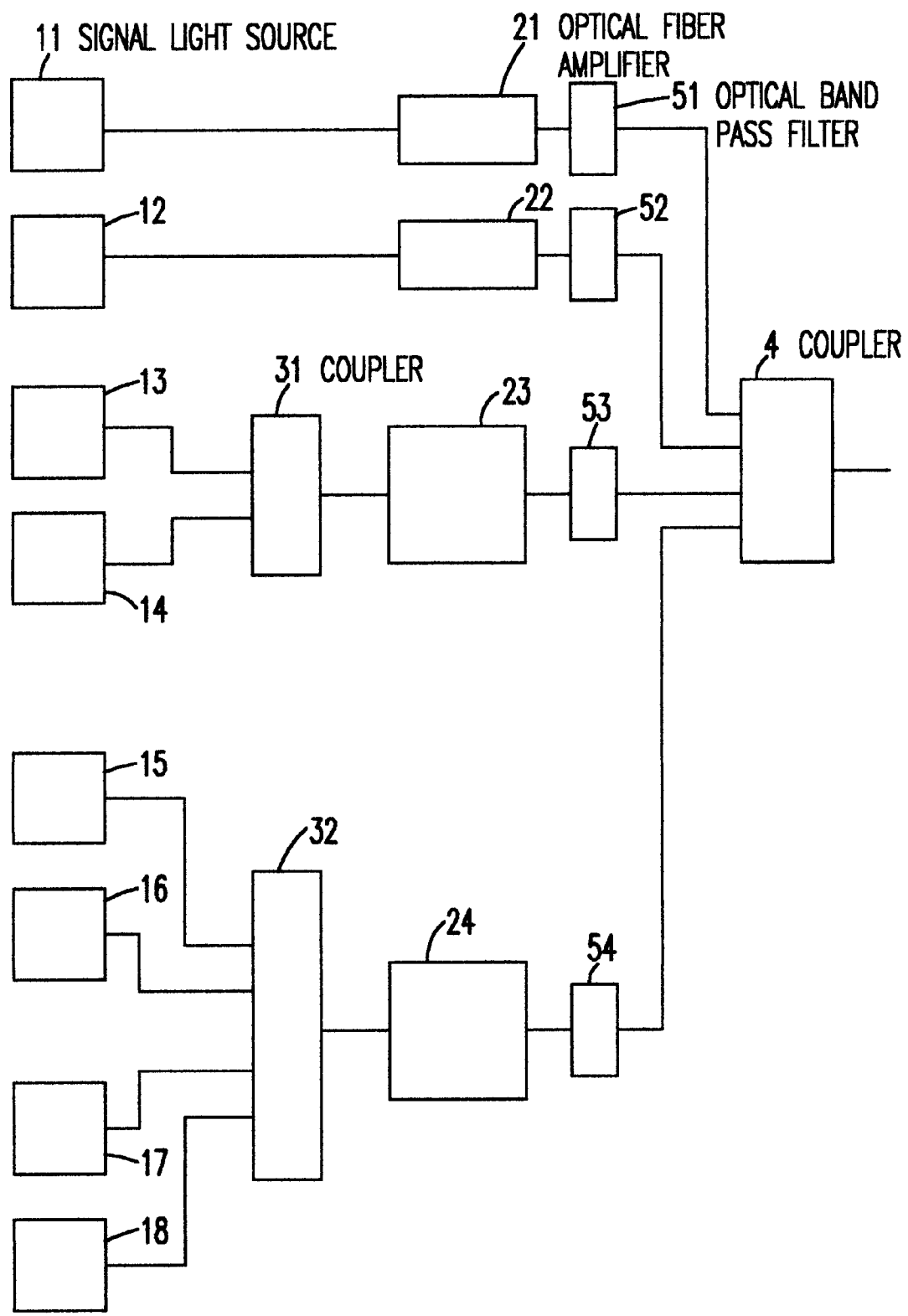
FIG. 4 shows a preferred embodiment of the invention of another type.

Next, the embodiments of the invention will be explained referring to the appended drawings. FIGS. 3 and 4 are block diagrams for illustrating a WDM optical communication system for eight optical signals by examples, shown as the embodiment of the invention. Moreover, FIG. 5 exemplifies the dependency of the gain of an optical fiber amplifier used in the embodiments on the wavelength of the optical signal.

Figure 5:
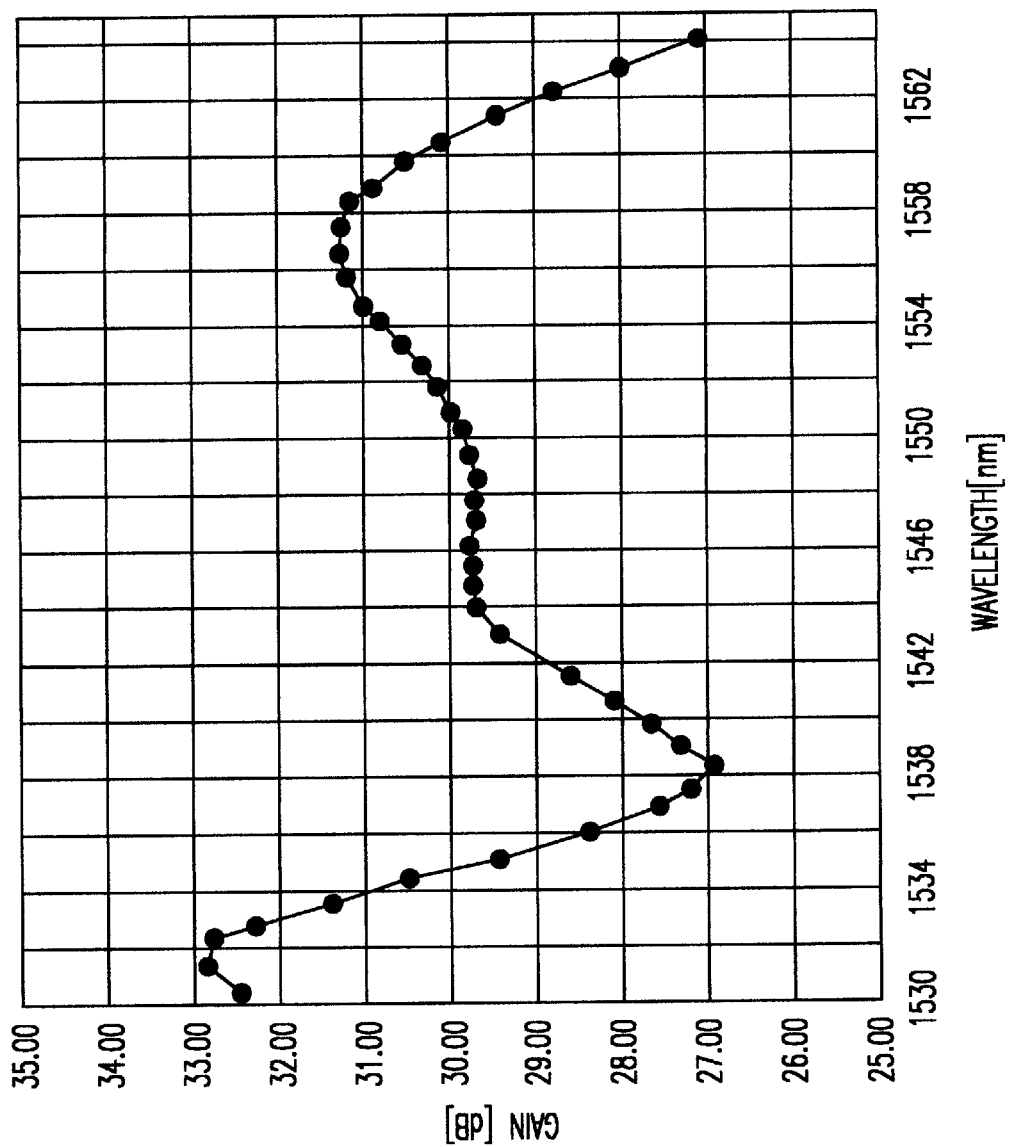
FIG. 5 shows dependency of gain of an optical fiber-amplifier on the wavelength.

FIG. 3 shows the most fundamental example of the embodiments of the invention. The WDM optical communication system is provided with signal light sources 11 to 18, the signal wavelengths of which are respectively $\lambda 1$ to $\lambda 8$. FIG. 5 shows the dependency of the gain of the optical fiber amplifier on the wavelength of the optical signal. In this embodiment, the wavelengths of the optical signals are classified in into four groups, that is to say, $\lambda 1$, $\lambda 2$, $\lambda 3$ to $\lambda 4$ and $\lambda 5$ to $\lambda 8$.

The optical signals corresponding to the wavelengths of $\lambda 1$ and $\lambda 2$ are respectively supplied to the optical fiber amplifiers 21 and 22, and amplified up to the desired powers.

The optical signals corresponding to the wavelengths of $\lambda 3$ and $\lambda 4$ are multiplexed by the coupler 31 and supplied to the optical fiber amplifier 23. As shown in FIG. 4, since gains of the optical fiber amplifier 23 for both the optical signals are nearly the same, the outputs of the optical fiber amplifier 23 are nearly the same for both the optical signals.

In the case of groups $\lambda 5$ to $\lambda 8$, the optical signals are multiplexed by the optical coupler 32 and supplied to the optical fiber amplifier 24, similarly to the case of the group $\lambda 3$ and $\lambda 4$.

The optical signals belonging to the group $\lambda 1$, $\lambda 2$, $\lambda 3$ to $\lambda 4$ and $\lambda 5$ to $\lambda 8$ are respectively amplified by the optical fiber amplifiers 21, 22, 23 and 24 are multiplexed by the coupler 4 and transmitted through an optical transmission line.

In the embodiment shown in FIG. 4, optical band pass filters 51 to 54 are respectively connected with the output ports of the optical fiber amplifiers 51 to 54, and the optical signals supplied from the optical band pass filters 51 to 54 are multiplexed by the coupler 4 and transmitted through the same optical transmission line. In this embodiment, SN ratios of the optical signals can be improved by the functions of the optical band pass filters 51 to 54.

The wavelength of the optical signals of the embodiment shown in FIG. 3 are as follows.

$\lambda 1$ : 1530 nm
$\lambda 2$ : 1538 nm
$\lambda 3$ : 1545 nm
$\lambda 4$ : 1548 nm
$\lambda 5$ : 1554 nm
$\lambda 6$ : 1556 nm
$\lambda 7$ : 1558 nm
$\lambda 8$ : 1560 nm The dependencies of the gains of all the optical fiber amplifiers on the wavelength of the optical signal are equal to each other as shown in FIG. 5. In consideration of the aforementioned characteristics of the optical fiber amplifiers, the optical signals are classified into four groups, which respectively correspond to the wavelengths of $\lambda 1$, $\lambda 2$, $\lambda 3$ to $\lambda 4$ and $\lambda 5$ to $\lambda 8$, and one or more optical signals belonging to the same group are amplified by the same optical amplifiers corresponding to the groups.

The optical signals belonging to the group $\lambda 3$ to $\lambda 4$ are multiplexed by the coupler 31 with insertion loss of 3dB, and those belonging to the group $\lambda 5$ to $\lambda 8$ are multiplexed by the coupler 32 with insertion loss of 6 db.

The output powers of the signal light sources 11 to 18 are so adjusted that the power level of each of the optical signals is −20 dBm at the input port of each of the optical fiber amplifiers, The numerical values of the gain of the optical fiber amplifier shown is FIG. 5 are tabulated in table 1.

TABLE 1

|  | wavelength | gain (dB) | amplifier |
|---|---|---|---|
| $\lambda_1$: | 1530 nm | 32.5 | ***21 |
| $\lambda_2$: | 1538 nm | 27.0 | ***22 |
| $\lambda_3$: | 1545 nm | 29.8 | ***23 |
| $\lambda_4$: | 1548 nm | 29.8 | ***23 |
| $\lambda_5$: | 1554 nm | 30.8 | ***24 |
| $\lambda_6$: | 1556 nm | 31.0 | ***24 |
| $\lambda_7$: | 1558 nm | 31.0 | ***24 |
| $\lambda_8$: | 1560 nm | 30.5 | ***24 |

The output power levels of the respective optical signals at the output ports of the optical fiber amplifiers 21 to 24 are tabulated in table 2.

TABLE 2

|  | wavelength | output power (dBm) | amplifier |
|---|---|---|---|
| $\lambda_1$: | 1530 nm | 12.5 | ***21 |
| $\lambda_2$: | 1538 nm | 7.0 | ***22 |
| $\lambda_3$: | 1545 nm | 6.8 | ***23 |
| $\lambda_4$: | 1548 nm | 6.8 | ***23 |
| $\lambda_5$: | 1554 nm | 4.8 | ***24 |
| $\lambda_6$: | 1556 nm | 5.0 | ***24 |
| $\lambda_7$: | 1558 nm | 5.0 | ***24 |
| $\lambda_8$: | 1560 nm | 4.5 | ***24 |

As shown in Table 2, the maximum difference between the output levels of the optical signals at the output ports of the optical fiber amplifiers occurs between the optical signals corresponding to the wavelengths $\lambda 1$ and $\lambda 8$, where the value of the maximum difference is 8.0 dB.

According to table 2, the output power levels of the optical fiber amplifier 23, which simultaneously amplifies the optical signals of the wavelengths of $\lambda 3$ and $\lambda 4$, are respectively 6.8 dBm, which is smaller than the optical power level obtained by the following relation by 3 dB.

$$-20.0(\text{dBm}) + 29.8(\text{dB}) = 9.8(\text{dBm})$$

The reason is that a total optical power amplified by the optical fiber amplifier is limited to a value peculiar to the optical fiber amplifier, so that, when n optical signals with the same powers are simultaneously amplified by the same optical fiber amplifier, the output power level per an optical signal is decreased by a factor of 1/n, as compared with that for the case of n=1. Then, 10 log (1/n)=−3(dB), for n=2.

=−6(dB), for n=4.

The output power levels of the optical fiber amplifier 24 shown in tables 1 and 2 can be justified by the aforementioned consideration.

The gain of the optical fiber amplifier 21, which corresponds to the optical signal of the wavelength of λ1, should be decreased by 8.0 dB. Similarly, the gains of the other optical fiber amplifiers 22 and 23 should be so adjusted that the output power level of each of the optical signals is nearly equal to 4.5 dBm.

According to the invention, the power levels of the transmitted optical signals in the WDK optical communication system can be increased, and the differences in the power levels between the optical signals can be nearly equal to zero.

Moreover, according to the invention, the number of the optical fiber amplifiers can be decreased as compare with that of the conventional WDM optical communication system, and the system becomes low-priced and small-sized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is that:

1. A wavelength division multiplexing (WDM) optical communication system comprising:

plural signal light sources for respectively generating optical signals with different wavelengths, wherein said optical signals are classified into plural groups of said optical signals, wherein said plural groups are classified according to optical signals having nearly a same power level, plural first stage optical couplers for respectively multiplexing said plural groups of said plural optical signals, plural optical amplifiers for respectively amplifying outputs of said plural first stage optical couplers, and a second stage optical coupler for multiplexing outputs of said plural optical amplifiers, plural optical amplifiers for respectively amplifying outputs of said plural first stage optical couplers, and a second stage optical coupler for multiplexing outputs of said plural optical amplifiers.

2. A WDM optical communication system according to claim 1 further comprising:

plural optical band pass filter for respectively transmitting outputs of said plural optical amplifiers, which are respectively allocated between said plural optical amplifiers and said second stage optical coupler.

3. A WDM optical communication system according to claim 1, wherein:

said optical amplifiers are respectively optical fiber amplifiers, cores of which are doped with rare earth metal.

4. A WDM optical communication system comprising:

plural signal light sources for respectively generating optical signals with different wavelengths, wherein, said optical signals are classified into one or more individual optical signals and one or more groups of plural optical signals, wherein each of said groups comprise optical signals having nearly a same power level, one or more first stage optical couplers for respectively multiplexing said one or groups of said plural optical signals, plural optical amplifiers for respectively amplifying said one or more individual optical signals and outputs of said one or more first stage optical couplers, and a second stage optical couplers for multiplexing outputs of said plural optical amplifiers.

5. A WDM optical communication system according to claim 4 further comprising:

plural optical band pass filter for respectively transmitting outputs of said plural optical amplifiers, which are respectively allocated between said plural optical amplifiers and said second stage optical coupler.

6. A WDN optical communication system according to claim 4, wherein:

said plural optical amplifiers are respectively optical fiber amplifiers, cores of which are doped with rare earth metal.

* * * * *